United States Patent
Lu et al.

(10) Patent No.: US 11,431,807 B2
(45) Date of Patent: Aug. 30, 2022

(54) DATA TRANSMISSION METHOD, TERMINAL DEVICE, AND NETWORK DEVICE

(71) Applicant: HUAWEI TECHNOLOGIES CO., LTD., Guangdong (CN)

(72) Inventors: Wei Lu, Shenzhen (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/106,790

(22) Filed: Nov. 30, 2020

(65) Prior Publication Data

US 2021/0084107 A1 Mar. 18, 2021

Related U.S. Application Data

(63) Continuation of application No. PCT/CN2019/088036, filed on May 22, 2019.

(30) Foreign Application Priority Data

May 31, 2018 (CN) .......................... 201810553803.8

(51) Int. Cl.
*G06F 15/173* (2006.01)
*H04L 67/141* (2022.01)

(52) U.S. Cl.
CPC .................. *H04L 67/141* (2013.01)

(58) Field of Classification Search
CPC . H04L 67/141; H04L 29/08072; H04L 41/22; H04L 29/06
See application file for complete search history.

(56) References Cited

U.S. PATENT DOCUMENTS

| 8,972,612 B2 * | 3/2015 | Le ........................ H04L 67/22 709/251 |
| 9,118,730 B2 * | 8/2015 | Fernandez Alonso ...................... H04L 67/2842 |
| 2005/0210141 A1 * | 9/2005 | Oyama ............... H04L 12/6418 709/228 |

(Continued)

FOREIGN PATENT DOCUMENTS

| CN | 101599896 A | 12/2009 |
| CN | 106792613 A | 5/2017 |

(Continued)

OTHER PUBLICATIONS

Huawei, HiSilicon, "TS 23.501: AF influenced PDU session establishment and DN authentication/authorization via NEF," 3GPP TSG SA WG2 Meeting #123, S2-177383, Ljubljana, Slovenia, Oct. 23-27, 2017, 6 pages.

(Continued)

*Primary Examiner* — Razu A Miah
(74) *Attorney, Agent, or Firm* — Fish & Richardson P.C.

(57) ABSTRACT

This application relates to a data transmission method. The method includes a terminal device receives indication information from a policy control function (PCF) network element. The indication information indicates data network access identifier information corresponding to an application. The method also includes the terminal device determines, based on the indication information, a PDU session for transmitting data of the application.

18 Claims, 8 Drawing Sheets

(56) References Cited

U.S. PATENT DOCUMENTS

| | | | |
|---|---|---|---|
| 2013/0054800 A1* | 2/2013 | Fernandez Alonso ........................ H04L 47/10 709/224 |
| 2014/0140322 A1* | 5/2014 | Brequigny ........ H04W 36/0011 370/331 |
| 2015/0365484 A1* | 12/2015 | Yu ........................ H04W 76/25 709/228 |
| 2016/0112502 A1* | 4/2016 | Clarke .................. H04L 43/028 709/201 |
| 2017/0366399 A1* | 12/2017 | Li ........................ H04W 40/34 |
| 2017/0367026 A1 | 12/2017 | Li et al. |
| 2018/0262924 A1* | 9/2018 | Dao .................. H04W 72/1257 |
| 2019/0059067 A1* | 2/2019 | Lee ........................ H04L 47/821 |
| 2019/0116631 A1* | 4/2019 | Talebi Fard .......... H04W 68/02 |
| 2019/0260677 A1* | 8/2019 | Zheng ..................... H04L 45/38 |
| 2019/0306251 A1* | 10/2019 | Talebi Fard ............ H04L 67/12 |

FOREIGN PATENT DOCUMENTS

| | | |
|---|---|---|
| CN | 107592331 A | 1/2018 |
| CN | 107690161 A | 2/2018 |
| KR | 20170119296 A | 10/2017 |
| WO | 2008082352 A1 | 7/2008 |
| WO | 2016028140 A1 | 2/2016 |
| WO | 2018066876 A1 | 4/2018 |
| WO | 2018086123 A1 | 5/2018 |

OTHER PUBLICATIONS

Huawei, HiSilicon, "Update to procedures to support service continuity in ULCL scenario," SA WG2 Meeting #122 bis, S2-175633, Sophia Antipolis, France, Aug. 21-25, 2017, 9 pages.

Huawei, HiSilicon, "TS 23.501: AF influenced PDU session establishment and DN authentication/authorization via NEF," 3GPP TSG SA WG2 Meeting #123, S2-177983, Ljubljana, Slovenia, Oct. 23-27, 2017, 6 pages.

Office Action issued in Chinese Application No. 201810553803.8 dated Oct. 28, 2020, 8 pages.

PCT International Search Report and Written Opinion issued in International Application No. PCT/CN2019/088036 dated Aug. 26, 2019, 15 pages (with English translation).

Ericsson, "Initial provisioning of traffic routing information", 3GPP TSG-CT WG3 Meeting #97, C3-183820, Osaka, Japan, May 21-25, 2018, 5 pages.

Nokia et al., "23.501 § 5.6.7: Application Function influence on traffic routing", SA WG2 Meeting #S2-121, S2-173837, May 29-Jun. 2, 2017, Hangzhou, China, 6 pages.

Office Action in Chinese Application No. 201810553803.8, dated Apr. 15, 2021, 6 pages.

Motorola Mobility et al., "Interim agreement: Determination of NSSAI based on UE policy," SA WG2 Meeting #118, S2-166603, Reno, Nevada, Nov. 14-28, 2016, 3 pages.

Extended European Search Report in European Application No. 19811262.5, dated Apr. 29, 2021, 11 pages.

* cited by examiner

DATA TRANSMISSION METHOD, TERMINAL DEVICE, AND NETWORK DEVICE

CROSS-REFERENCE TO RELATED APPLICATIONS

This application is a continuation of International Application No. PCT/CN2019.088036, filed on May 22, 2019, which claims priority to Chinese Patent Application No. 201810553803.8, filed on May 31, 2018. The disclosures of the aforementioned applications are hereby incorporated by reference in their entireties.

TECHNICAL FIELD

This application relates to the field of communications technologies, and in particular, to a data transmission method, a terminal device, and a network device.

BACKGROUND

To enable user equipment (UE) to transmit application data, a mobile communications network establishes a packet data unit (PDU) session for the UE. The PDU session is a part of a data transmission channel between the UE and a data network (DN). The data transmission channel between the UE and the DN is established, so that the UE can send data to the DN.

For an application in the DN, for example, a Taobao application or a Jingdong application, a communication connection is established, by using the PDU session, to an application function (AF) network element corresponding to the application in the DN. According to a current protocol, the AF network element may send an application request to a network device, and the application request may be used to request policy information. However, in the prior art, how a terminal device executes the policy information that is requested by the AF network element is not described.

SUMMARY

In view of this, this application provides a data transmission method, a terminal device, and a network device, to provide a data transmission mode of an application.

According to a first aspect, an embodiment of this application provides a data transmission method. The method is performed by a terminal device, and mainly includes: The terminal device receives indication information from a PCF network element, where the indication information is used to indicate data network access identifier information corresponding to an application; and then the terminal device determines, based on the indication information, a PDU session used to transmit data of the application.

In this way, the terminal device may transmit, in a same PDU session, applications corresponding to same data network access identifier information. Because there is a correspondence between the data network access identifier information and the UPF network element, the UPF network element in the PDU session may be determined based on the data network access identifier information, and UPF network elements corresponding to different applications are the same. In this way, there are not many UPF network elements connected in series in one PDU session, and a session transmission channel is shorter than a path in the prior art. Therefore, data transmission efficiency is improved.

In a possible implementation, the indication information may be the DNA information corresponding to the application, or information about a DNAI capability requested by the application, and parameter information used to determine the DNAI information corresponding to the application. For example, the parameter information may be geographical location information of an application server.

In a possible implementation, when the indication information includes the information about the DNAI capability requested by the application, the terminal device may transmit, in a same PDU session, an application with a DNAI request capability. In other words, the terminal device transmits, in different PDU sessions, an application without a DNAI request capability.

In a possible implementation, when the indication information includes the DNA information corresponding to the application, the terminal device may transmit, in a same PDU session, applications corresponding to same DNAI information. In other words, the terminal device transmits, in different PDU sessions, applications corresponding to different DNAI information.

This is performed because the applications with the same DNA information correspond to the same UPF network element. Therefore, the terminal device selects to transmit, in the same PDU session, the applications corresponding to the same DNAI information. In this way, a problem that a plurality of different UPF network elements are connected in series in a session transmission channel does not exist. Therefore, data transmission efficiency is improved to some extent.

In a possible implementation, the terminal device may alternatively map applications corresponding to same DNAI information to a same DNN, and then transmit, in a same PDU session, data of applications corresponding to a same DNN. In other words, the terminal device transmits, in different PDU sessions, data of applications corresponding to different DNNs.

Similarly, because the applications with the same DNAI information are mapped to the same DNN, the DNN corresponds to the same UPF network element, and data of the applications corresponding to the same DNN is transmitted in the same PDU session, and the UPF network element in the PDU session may be determined. In this way, a problem that a plurality of different UPF network elements are connected in series in a session transmission channel does not exist. Therefore, data transmission efficiency is improved to some extent.

In a possible implementation, the terminal device may alternatively transmit, in a same PDU session, data of applications corresponding to same parameter information. In other words, the terminal device transmits, in different PDU sessions, data of applications corresponding to different parameter information.

Similarly, the applications are with the same parameter information. For example, if different applications correspond to a same geographical location of an application server, same DNAI information may be determined based on the geographical location. Therefore, the applications with the same DNAI information correspond to the same UPF network element. In this way, the terminal device selects to transmit, in the same PDU session, the applications corresponding to the same DNAI information, so that a problem that a plurality of different UPF network elements are connected in series in a session transmission channel does not exist. Therefore, data transmission efficiency is improved to some extent.

According to a second aspect, an embodiment of this application provides a data transmission method. The method is performed by a PCF network element, and mainly includes: The PCF network element obtains DNAI information corresponding to an application, and then the PCF network element sends indication information to a terminal device, so that the terminal device determines, based on the indication information, a PDU session used to transmit data of the application.

Because the PCF network element receives a request from an application layer, the PCF network element may obtain the DNAI information from the request. In this way, the PCF network element may transmit the DNAI information to the terminal device by using the indication information, and the terminal device selects, based on the DNAI information, the PDU session in which the application is located, or establishes the PDU session based on the DNAI information. Because there is a correspondence between the data network access identifier information and the UPF network element, the UPF network element in the PDU session may be determined based on the data network access identifier information, and UPF network elements corresponding to different applications are the same. In this way, there are not many UPF network elements connected in series in one PDU session, and a session transmission channel is shorter than a path in the prior art. Therefore, data transmission efficiency is improved.

In a possible implementation, the PCF network element may alternatively obtain at least one of an effective location area and an effective time of the DNAI information from the request of the application layer. In this way, when the terminal device initiates PDU session establishment, the PCF network element may determine, based on the effective location area and the effective time, whether a location of the terminal device is in the effective location area, or whether a time of the PDU session establishment message is within the effective time. If yes, the PCF network element may send policy information that includes the indication information to an SMF network element, and then the SMF network element selects the UPF network element in the PDU session based on the indication information.

On the contrary, if no, the PCF network element sends, to the SMF network element, policy information that does not include the indication information, and then the SMF network element selects the UPF network element in the PDU session based on an existing procedure.

This is performed because the DNAI information from the application layer may have a specific effective period or limitation condition. If the PDU session established by the terminal device does not meet the requirement, the UPF network element cannot be selected based on the DNAI information. Otherwise, the data of the application may fail to be correctly transmitted.

According to a third aspect, an embodiment of this application provides a terminal device, to implement any method according to the first aspect.

In a possible design, the terminal device has a function of implementing behavior of the terminal device in any method according to the first aspect. The function may be implemented by hardware, or may be implemented by hardware executing corresponding software. The hardware or the software includes one or more modules corresponding to the foregoing function. Optionally, the terminal device may be user equipment. The terminal device is configured to receive indication information from a PCF network element, where the indication information is used to indicate DNAI information corresponding to an application, and then the terminal device determines, based on the indication information, a PDU session used to transmit data of the application.

In a possible design, a structure of the terminal device includes a transceiver and a processor. The processor is configured to support the terminal device in performing a corresponding function in any method according to the first aspect, for example, generating, receiving, or processing data and/or information in the foregoing method. The communications interface is configured to: support communication between the terminal device and another network element, and send information or an instruction in any method according to the first aspect to the another network element or receive information or an instruction in any method according to the first aspect from the another network element. The terminal device may further include a memory. The memory is configured to couple with the processor. The memory stores a program instruction and data that are necessary for the terminal device.

According to a fourth aspect, an embodiment of this application provides a network device, to implement any method according to the second aspect.

In a possible design, the network device has a function of implementing behavior of the network device in any method according to the second aspect. The function may be implemented by hardware, or may be implemented by hardware executing corresponding software. The hardware or the software includes one or more modules corresponding to the foregoing function. The network device may be configured to receive and obtain DNAI information corresponding to an application, and then the network device sends indication information to a terminal device. In this way, the terminal device may determine, based on the indication information, a PDU session used to transmit data of the application.

In a possible design, a structure of the network device includes a processor and a communications interface. The processor is configured to support the network device in performing a corresponding function in any method according to the second aspect, for example, generating, receiving, or processing data and/or information in the foregoing method. The communications interface is configured to: support communication between the network device and another network element, and send information or an instruction in any method according to the second aspect to the another network element or receive information or an instruction in any method according to the second aspect from the another network element. The network device may further include a memory. The memory is configured to couple with the processor. The memory stores a program instruction and data that are necessary for the network device.

According to a fifth aspect, an embodiment of this application provides a computer storage medium, configured to store a computer software instruction used by the terminal device according to the first aspect. The computer software instruction includes a program designed for performing the first aspect.

According to a sixth aspect, an embodiment of this application provides a computer storage medium, configured to store a computer software instruction used by the network device according to the second aspect. The computer software instruction includes a program designed for performing the second aspect.

According to a seventh aspect, this application further provides a computer program product including an instruction. When the computer program product is run on a computer, the computer is enabled to perform the method according to the first aspect. The computer program product includes a computer-executable instruction. The computer-executable instruction is stored in a computer-readable storage medium. A processor of a terminal device may read the computer-executable instruction from the computer-readable storage medium. The processor executes the computer-executable instruction, so that the terminal device performs the steps performed by the terminal device in the foregoing method provided in the embodiments of this application, or functional units corresponding to the steps are deployed for the terminal device.

According to an eighth aspect, this application further provides a computer program product including an instruction. When the computer program product is run on a computer, the computer is enabled to perform the method according to the second aspect. The computer program product includes a computer-executable instruction. The computer-executable instruction is stored in a computer-readable storage medium. A processor of a network device may read the computer executable instruction from the computer-readable storage medium. The processor executes the computer executable instruction, so that the network device performs the steps performed by the network device in the foregoing method provided in the embodiment of this application, or functional units corresponding to the steps are deployed for the network device.

According to a ninth aspect, this application further provides a chip system. The chip system includes a processor, configured to support a terminal device in implementing a function according to the first aspect, for example, generating, receiving, or processing data and/or information in the foregoing method. In a possible design, the chip system further includes a memory. The memory is configured to store a program instruction and data that are necessary for the terminal device. The chip system may include a chip, or may include a chip and another discrete device.

According to a tenth aspect, this application further provides a chip system. The chip system includes a processor, configured to support a network device in implementing a function according to the third aspect, for example, generating, receiving, or processing data and/or information in the foregoing method. In a possible design, the chip system further includes a memory. The memory is configured to store a program instruction and data that are necessary for the network device. The chip system may include a chip, or may include a chip and another discrete device.

DESCRIPTION OF EMBODIMENTS

The following clearly and entirely describes the technical solutions in the embodiments of this application with reference to the accompanying drawings in the embodiments of this application.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

This application may be applied to an existing cellular communications system, for example, a global system for mobile communications (GSM) system, a wideband code division multiple access (WCDMA) system, or a long term evolution (LTE) system, and is applicable to a 5th generation (5G) mobile communications system. If a communications system such as a new radio (NR) access network communications system or a cloud radio access network (CRAN) communications system is used, this application may also be applied to a similar wireless communications system, for example, a wireless fidelity (wifi) communications system, a worldwide interoperability for microwave access (WiMAX) communications system, a 3rd generation partnership project (3GPP) communications system, and another related cellular system. This application is also applicable to another wireless communications system that uses an orthogonal frequency division multiplexing (OFDM) access technology, and is also applicable to a future wireless communications system.

The network architecture and the service scenario described in this application are intended to describe the technical solutions in this application more clearly, and do not constitute a limitation on the technical solutions provided in this application. A person of ordinary skill in the art may know that: With the evolution of the network architecture and the emergence of new service scenarios, the technical solutions provided in this application are also applicable to similar technical problems.

Figure 1:
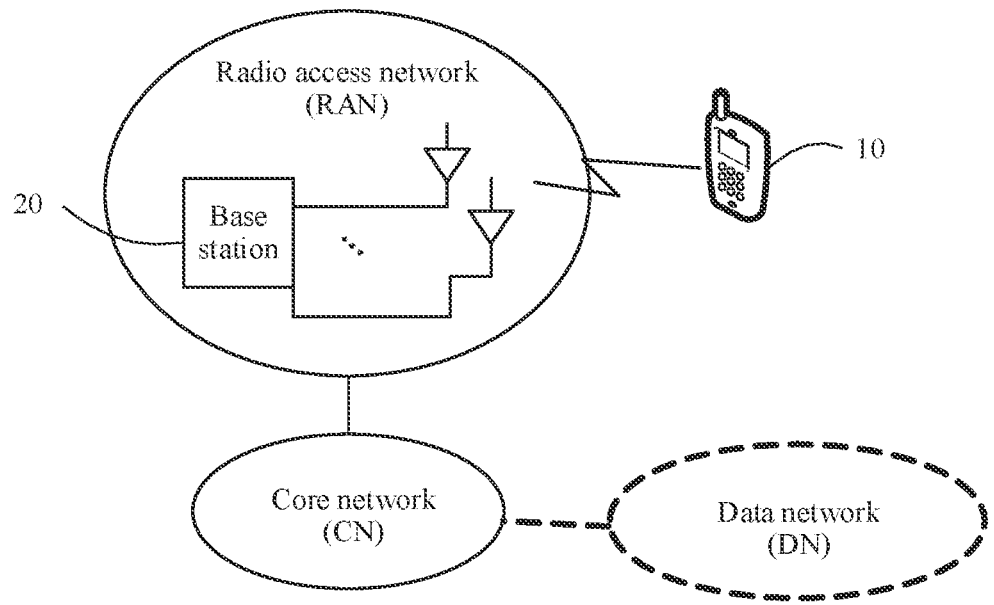
FIG. 1 is a schematic diagram of a communications system according to an embodiment of this application.

FIG. 1 is a schematic diagram of a possible application scenario according to this application. In the application scenario, at least one terminal device 10 is included, and communicates with a radio access network (RAN) through a radio interface. The RAN includes at least one base station 20. For clarity, only one base station and one terminal device are shown in the figure. The terminal device 10 may alternatively perform communication, for example, communication in a device-to-device (D2D) or machine-to-machine (M2M) scenario, with another terminal device 10. The base station may perform communication with the terminal device 10, or may perform communication, for example, communication between a macro base station and an access point, with another base station. The RAN is connected to a core network (CN). Optionally, the CN may be coupled to one or more data networks (DN), such as an internet and a public switched telephone network (PSTN).

In this application, nouns "network" and "system" are usually interchangeably used, but a person skilled in the art can understand meanings of the nouns.

Figure 2A:
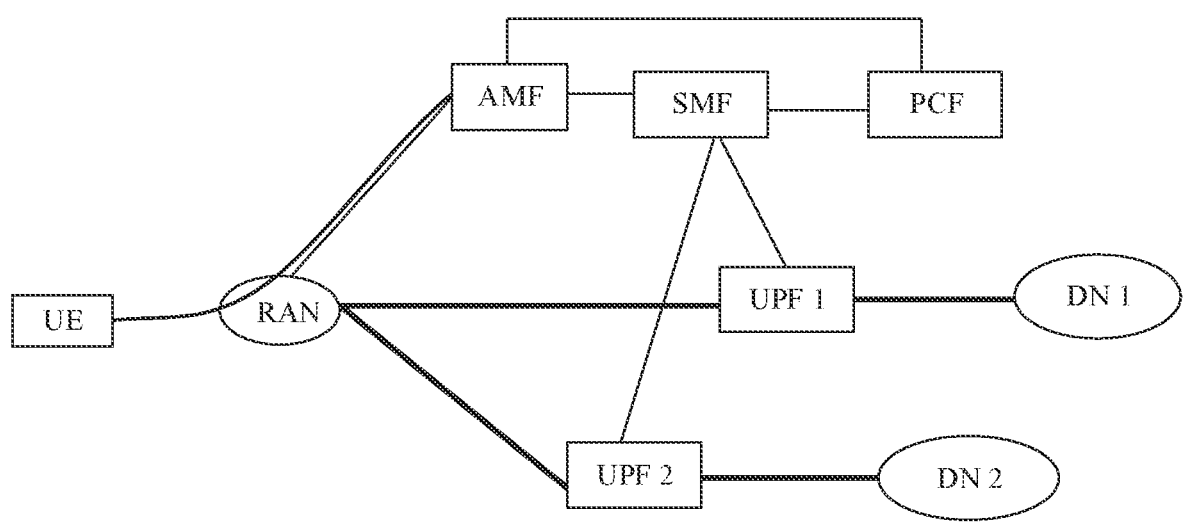
FIG. 2a and FIG. 2b are schematic diagrams of network architectures of session channel transmission paths according to embodiments of this application.
Figure 2B:
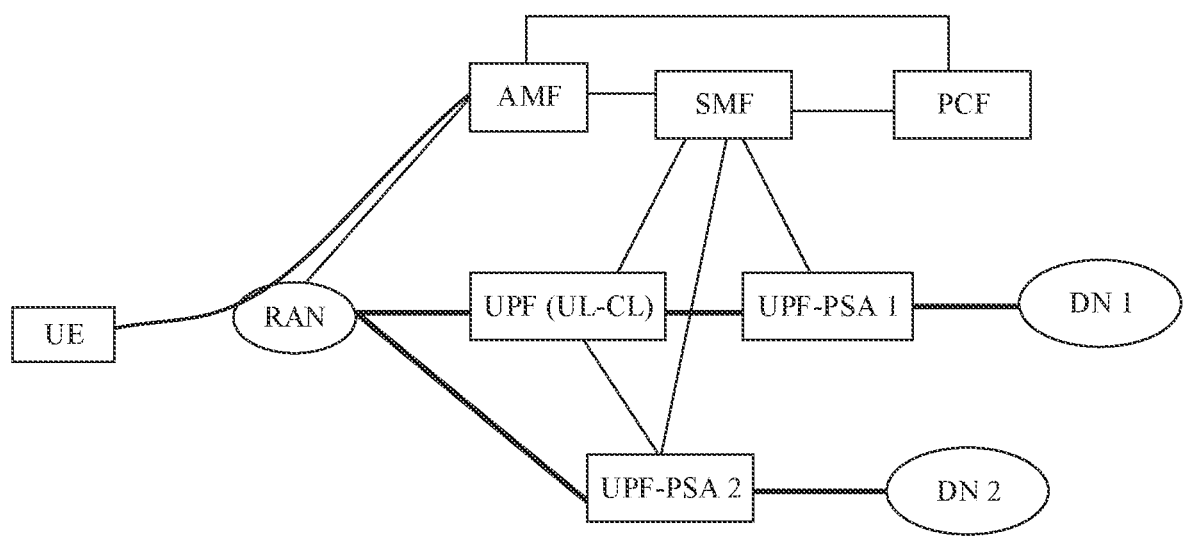

A PDU session is a channel between a terminal device and a user plane function (UPF) network element. The PDU session is a part of a data transmission channel between UE and a data network (DN). The data transmission channel between the UE and the DN is established, so that the UE may send data to the DN. The data transmission channel may refer to the following two different forms (namely, logical deployment forms of one or more UPF network elements). FIG. 2a and FIG. 2b show two network architectures of a 5th generation mobile communications (5G) technology. A bold black line indicates a data transmission channel route (namely, data route between UE and a DN), and a thin line indicates a control signaling route.

In FIG. 2a, each data transmission channel includes one UPF network element. A data transmission path in FIG. 2b includes two data transmission branches (namely, UPF-UL CL-UPF-PSA 2 and UPF-UL CL-UPF-PSA 1). Two UPF network elements of the data transmission branches are connected in series. The two data transmission channels shown in FIG. 2a and FIG. 2b are not limited in the network architectures. There may alternatively be a plurality of data transmission channels, and each data transmission channel may include two or more UPF network elements. In conclusion, one data transmission channel may include at least one UPF network element. In the foregoing system architectures, the UPF network element is slightly different. A UPF-uplink classifier (uplink classifier, UL CL) is a transmission channel that is for a data flow and that is determined based on a data flow characteristic. A UPF-PDU session anchor (PDU session anchor, PSA), for example, a UPF-PSA 1 or a UPF-PSA 2, is an anchor for data transmission, and is also a termination point of a data flow in a mobile communications network. After passing through the network element, the data flow is sent to an external data network.

Main network devices in the foregoing network architectures include an access and mobility management function (AMF) network element, a session management function (SMF) network element, a policy control function (PCF) network element, a UPF network element, and the like. The AMF network element is responsible for access and mobility management, completes registration management, connection management, reachability management, mobility management, and the like, and transparently routes a session management message to an SMF device. The SMF network element is responsible for session management, IP address allocation and management of the UE, and UPF network element allocation and selection, and is responsible for selection and reselection of a UPF and a user plane path, and the like. The UPF network element is responsible for functions such as data routing and forwarding, lawful interception, downlink data buffering, and triggering of a downlink data notification message. The PCF network element is responsible for generating policy or rule information, and sending the policy or rule information and the like to the SMF.

It should be noted that the UPF network element in the data transmission channel may be dynamically added or deleted. In one case, when a PDU session is initially established, one or more UPF network elements may be selected from the data transmission channel based on information such as a policy or a rule of an operator. For example, the SMF network element may select one or more UPF network elements from the data transmission channel based on information such as location information and service information of the terminal user. Alternatively, in another case, after the PDU session is initially established, some UPF network elements in the data transmission channel may be deleted based on information such as a policy or a rule of an operator. For example, the SMF may delete some UPF network elements in the data transmission channel based on information such as location information and service information of the terminal user. In conclusion, the UPF network element in the data transmission channel may be dynamically added or deleted based on the information such as the policy or the rule.

To facilitate understanding, the following describes some device names in this application.

(1) A terminal device, including user equipment (UE), terminal, and the like, is a device that provides voice and/or data connectivity for a user, for example, a handheld device, a vehicle-mounted device, a wearable device, a computing device, or a control device that has a wireless connection function or a wireless communication function, another processing device connected to a wireless modem, and various forms of mobile stations (MS). Common terminal devices include a mobile phone, a tablet computer (pad), a notebook computer, a palmtop computer, a mobile internet device (MID), and a wearable device such as a smartwatch, a smart band, or a pedometer. For ease of description, the foregoing devices are collectively referred to as the terminal device in this application.

It should be noted that, for ease of description, "terminal device" and "UE" are alternately used subsequently in this application, and both mean the terminal device.

(2) A base station, also referred to as a RAN device, is a device that connects a terminal device to a wireless network, and includes but is not limited to an evolved NodeB (eNB), a radio network controller (RNC), a NodeB (NB), a base station controller (BSC), a base transceiver station (BTS), a home eNodeB (for example, a home evolved NodeB, or a home NodeB, HNB for short), a baseband unit (BBU), a gNodeB (gNB), a transmission and reception point TRP), a transmission point (TP), a mobile switching center, and the like. In addition, the base station may further include a Wi-Fi access point (AP), and the like, and further include various forms of macro base stations, micro base stations, relay stations, access points, remote radio units (RRU), or the like. In different systems, a device having a base station function may have different names. For example, in an LTE network, the device is referred to as an evolved NodeB (eNB, or eNodeB), and in a 3rd generation (rd generation) network, the device is referred to as a NodeB; and in a fifth generation network, the device is referred to as a 5G-RAN.

(3) A network device, in this application, is a network element in a core network, for example, an AMF network element, an SMF network element, a PCF network element, and a UPF network element.

In this application, in different application scenarios, the network device refers to different network elements. In some application scenarios, the network device refers to the PCF network element, and in some application scenarios, the network device refers to the SMF network element. A description and an explanation are provided in a specific application scenario.

It should be noted that, in this application, an application may also be understood as application data, an application data flow, an application data packet, data, a data packet, or a data flow, which has a same meaning.

In this application, the DN may include an application server, the application server may provide an application service for the terminal device, and the application server may include an application layer service processing service module and an application function (AF) network element. That is, the AF network element may be deployed in the application server.

Figure 3:
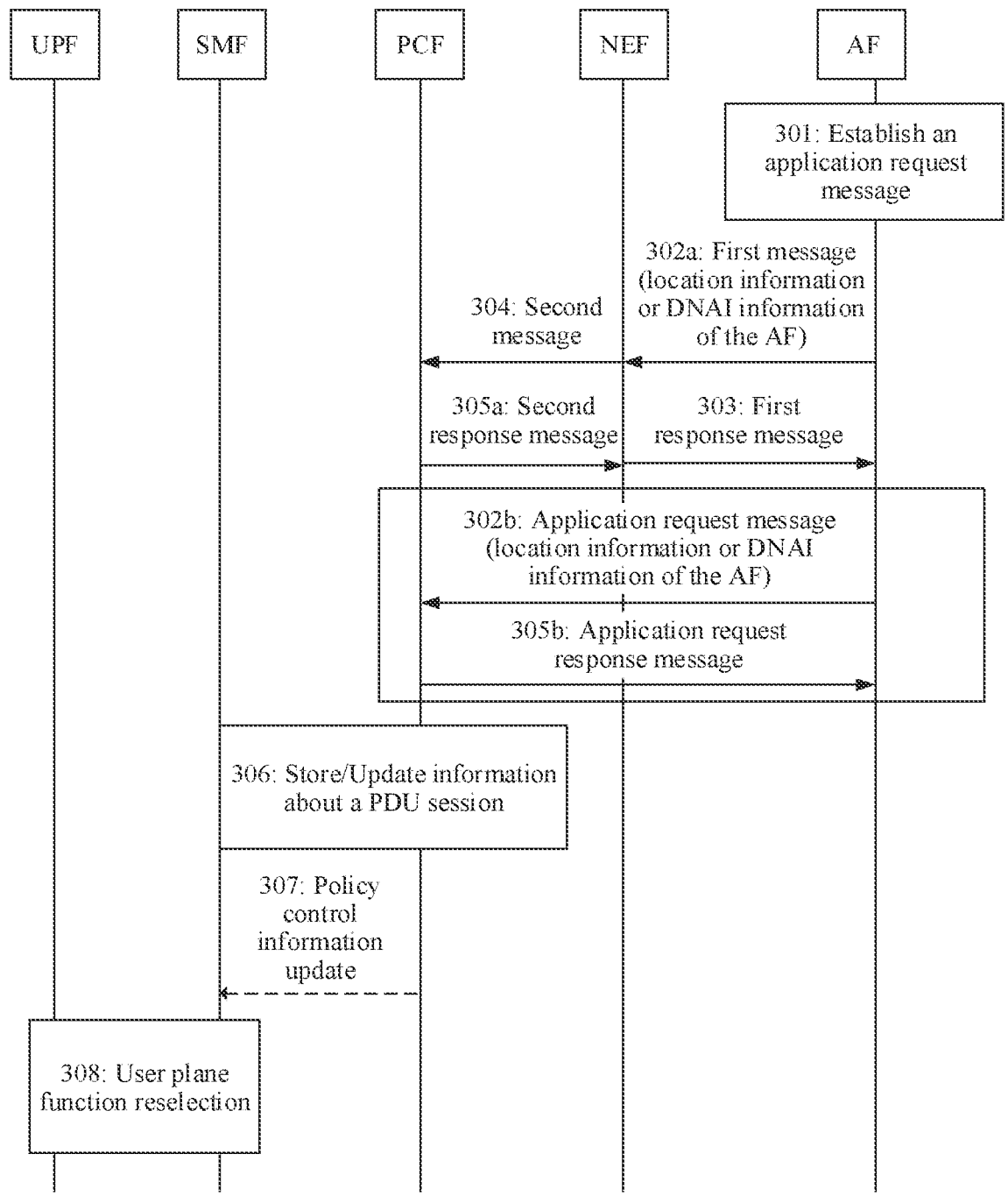
FIG. 3 is a schematic diagram of a method in which an application request affects a policy or a rule according to an embodiment of this application.

As described in the background, a routing policy request of the AF network element affects a routing policy rule of the PCF network element. A specific interaction procedure is shown in FIG. 3.

Step 301: An AF network element establishes an application request message, where the application request message may include geographical location information or DNAI information of the AF network element.

The geographic location information of the AF network element is, for example, an application request message from an AF network element of a Taobao application, for example, a request for connecting a data network access point of a PDU session to an application server of the Taobao application in Beijing.

Step 302a: The AF network element sends a first message to a network exposure function (NEF) network element, where the first message includes the application request message, that is, includes the location information or the DNAI information of the AF network element.

In a possible design, if the application request message includes the location information of the AF network element, the NEF network element may map the location information of the AF network element to one or more DNAs.

Step 303: The NEF network element sends a first response message to the AF network element, where the first response message is used to notify the AF network element that processing of the application request message is completed.

Step 304: The NEF network element sends a second message to a PCF network element, where the second message is used to request the PCF network element to process the application request message.

Step 305a: The PCF network element sends a second response message to the NEF network element, where the second response message is used to notify the NEF network element that processing of the application request message is completed.

Step 306: After the PCF network element receives related information (the location information or the DNAI information of the AF network element) requested by the AF network element, the PCF network element generates policy or rule information, where the policy or rule information includes the DNAI information (one or more DNAIs).

It should be noted that the application request message may not be forwarded through the NEF network element, and the PCF network element directly obtains information about the application request from the AF network element, that is, step 302a to step 305a are replaced with the following step 302b and step 305b.

Step 302b: The AF network element sends the application request message to the PCF network element, where the application request message includes the location information or the DNAI information of the AF network element.

Step 305b: The PCF network element sends an application request response message to the AF network element.

In this way, the application request message from the application affects the routing policy information on a network side. When a PDU session is established, and when the SMF network element obtains the routing policy information, the SMF network element determines, based on one or more DNAIs in the routing policy, the UPF network element in the PDU session in which the application is located. In this case, when the PDU session is established, if the terminal device cannot determine an application corresponding to a current PDU session, the SMF network element may select, based on information in the routing policy, a plurality of UPF network elements corresponding to DNAI information of a plurality of applications. Especially, there are a plurality of applications in a same PDU session, and each application may correspond to different DNAI information. Clearly, because there are too many UPF network elements, a plurality of UPF network elements are connected in series in one PDU session. Consequently, a session transmission path is quite long, more burden is brought to a network, and data transmission efficiency is low.

Figure 4:
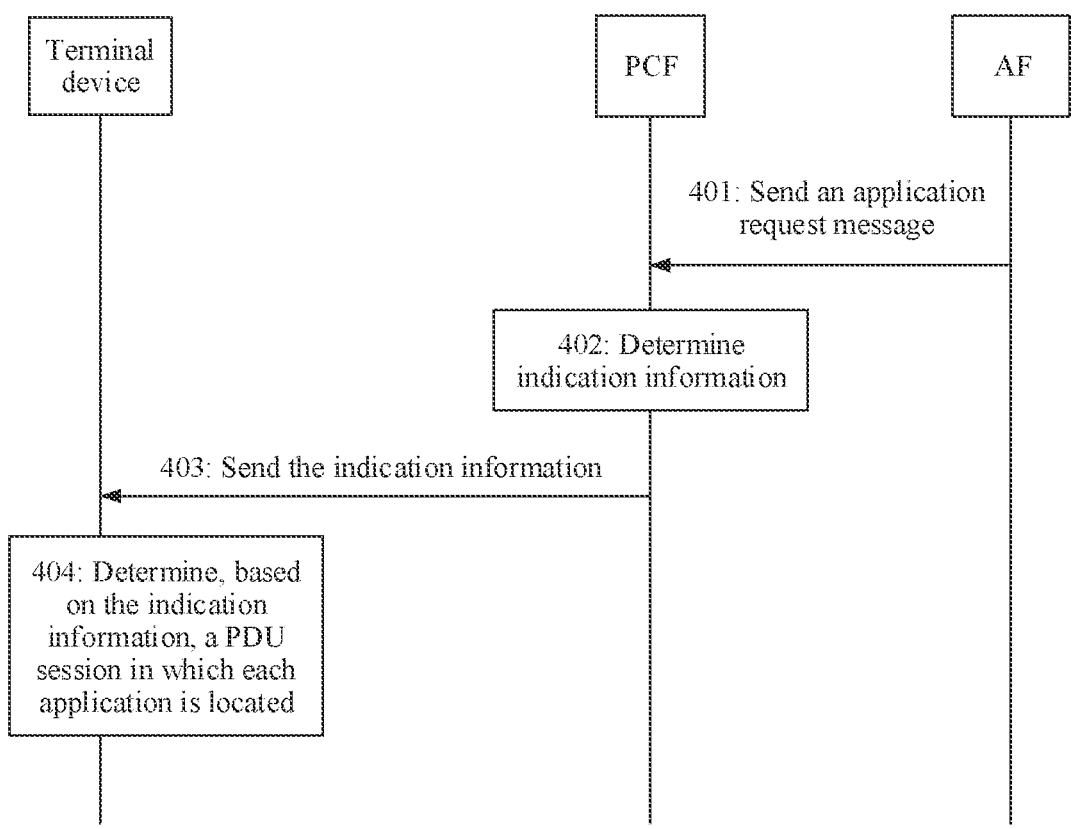
FIG. 4 is a schematic diagram of a data transmission method according to an embodiment of this application.

To resolve this problem, the embodiments of this application provide a data transmission method, which is mainly applicable to a scenario in which an application request affects a policy or a rule. Specifically, when the terminal device determines a PDU session in which each application is located or the terminal device needs to establish a PDU session corresponding to each application, the terminal device first obtains application-related indication information from a network side, that is, determines, based on DNAI information corresponding to each application, a PDU session used to transmit data of each application. FIG. 4 shows a data transmission method according to an embodiment of this application. The method may include the following steps.

Step 401: An AF network element corresponding to an application sends an application request message to a PCF network element, where the application request message may be DNAI information, geographical location information of an application server, or the like.

In step 401, the AF network element may directly send the application request message to the PCF network element, or may forward the application request message to the PCF network element through a NEF network element.

Step 402: The PCF network element determines indication information based on the application request message, and then sends the indication information to a terminal device.

The PCF network element may send, to the terminal device through an SMF network element/an AMF network element, policy information including the indication information. The indication information may be at least one of DNA information corresponding to the application, information about a DNAI capability requested by the application, and parameter information used to determine the DNAI information corresponding to the application. For example, the parameter information may be the geographical location information of the application server.

Step 403: The terminal device determines, based on the indication information, a PDU session used to transmit data of the application.

It should be noted that there is a correspondence between the DNAI information and a UPF network element. The DNAI information may be in a one-to-one correspondence (namely, a one-to-one relationship) with the UPF network element, or may be in a many-to-one or one-to-many correspondence with the UPF network element. In other words, the DNAI information may not be in a one-to-one correspondence with the UPF network element. Therefore, when the terminal device initiates PDU session establishment, the SMF network element may select the UPF network element based on the DNAI information by using the correspondence.

In addition, the AF network element in the foregoing steps may be an AF network element of one application or AF network elements of a plurality of applications. The PCF network element receives application request messages from the AF network elements of the applications, generates indication information based on the application request messages, and then sends the indication information to the terminal device. In this way, the terminal device may determine, based on the indication information, a PDU session corresponding to each application. In other words, the terminal device may initiate the PDU session establishment based on the indication information, to notify the SMF network element to select a corresponding UPF network element for the PDU session established by the application. Specifically, the terminal device determines, in the following several manners, the PDU session corresponding to each application.

Manner 1

If first indication information includes the DNAI information, the terminal device may transmit, in a same PDU session, applications corresponding to same DNAI information. In other words, when determining the PDU session used to transmit the data of the application, the terminal device determines, based on whether DNAs are the same, the PDU session in which the application is located. Because the UPF network element in a data transmission channel may be dynamically added or deleted, after the terminal device determines the PDU session in which the application is located, the SMF network element may add or delete the UPF network element in the session based on the DNAI information.

For example, there are three applications, an APP 1, an APP 2, and an APP 3 in a current DN, and the three applications respectively correspond to a DNAI 1, a DNAI 2, and a DNAI 2 of the DNAI information, as listed in Table 1.

TABLE 1

| Application | DNAI information |
|---|---|
| APP 1 | DNAI 1 |
| APP 2 | DNAI 2 |
| APP 3 | DNAI 2 |
| ... | ... |

After obtaining the policy information listed in Table 1, the terminal device may transmit data of the APP 2 and the APP 3 in a same PDU session 1, and separately transmit data of the APP 1 in another PDU session 2. It should be noted that the policy information may further include information such as a DNN and an SSC mode. If information such as DNNs and SSC modes of different applications in the policy information is the same, processing may be performed in this manner. If information such as DNNs and SSC modes is not completely different, these factors may further need to be considered, and a PDU session in which the application is located is determined. For example, when the DNNs and the SSC modes of different applications are the same, but DNAIs are different, it is determined that data of these applications is transmitted in a same PDU session.

FIG. 2a is used as an example. It is assumed that after obtaining the policy information, the terminal device determines to transmit the data of the application APP 2 to the application server (namely, the AF network element) in the DN 1 corresponding to the DNAI 2. In this case, the terminal device selects the established PDU session 1 (where the UPF 1 is used), and transmits the data of the APP 2 to the DN 1. If the PDU session 1 corresponding to the DNAI 2 does not exist in FIG. 2a, the terminal device establishes the PDU session 1 corresponding to the DNAI 2, and transmits the data of the application APP 2 on the established PDU session 1.

Manner 2

It should be noted that, in addition to the direct correspondence between the application and the DNAI information shown in Table 1, an indirect correspondence may also be established between the application and the DNAI information by using other information. For example, based on the DNAI information requested by the application, a network function device or the terminal device may map, to a same DNN, a plurality of applications that request same DNAI information. In other words, the network function device or the terminal device may dynamically determine DNN information corresponding to each application. If the network function device maps, to the same DNN, the plurality of applications that request the same DNAI information, the indication information may refer to the DNN. If a communications function device maps, to the same DNN, the plurality of applications that request the same DNAI information, the indication information may be the DNAI information.

For example, there are three applications, an APP 1, an APP 2, and an APP 3 in a current DN, and the three applications respectively correspond to a DNAI 1, a DNAI 2, and a DNAI 2 of the DNAI information, as listed in Table 2.

TABLE 2

| Application | DNAI information | DNN information |
|---|---|---|
| APP 1 | DNAI 1 | DNN 1 |
| APP 2 | DNAI 2 | DNN 2 |
| APP 3 | DNAI 2 | DNN 2 |
| ... | ... | |

It can be learned from Table 2 that the network function device or the terminal device maps the APP 2 and the APP 3 that request the DNAI 2 to the same DNN 2, and separately maps the APP 1 that requests the DNAI 1 to the DNN 1. After obtaining the policy information listed in Table 2, the terminal device may transmit data of the APP 2 and the APP 3 in a same PDU session 1, and separately transmit data of the APP 1 in another PDU session 2. It should be noted that the policy information may further include information such as a DNN and an SSC mode. If information such as DNNs and SSC modes of different applications in the policy information is the same, processing may be performed in this manner. If information such as DNNs and SSC modes is not completely different, these factors may further need to be considered, and a PDU session in which the application is located is determined. For example, when DNNs and SSC modes of different applications are the same, but DNAIs are different, it is determined that data of these applications is transmitted in a same PDU session.

FIG. 2a is used as an example. It is assumed that after obtaining the policy information, the terminal device determines that the data of the application APP 2 needs to be transmitted to the application server (namely, the AF network element) in the DN 1. In this case, the terminal device selects the established PDU session 1 (where the UPF 1 is used), and transmits the data of the APP 2 to the DN 1. If the PDU session 1 corresponding to the DNAI 2 does not exist in FIG. 2a, the terminal device establishes the PDU session 1 corresponding to the DNAI 2, and transmits the data of the application APP 2 on the established PDU session 1.

Manner 3

Alternatively, the indication information may be information determined based on the application request message. For example, if the application request message may be location area information, the indication information is the DNAI information obtained by the PCF network element based on a location area. Then, after receiving the policy information from the PCF network element, the terminal device may transmit, in the same PDU session, data of applications with same DNAI information.

Manner 4

The indication information may be a DNAI capability (DNAI capability) requested by the application. After receiving the policy information from the PCF network element, the terminal device transmits, in the same PDU session, data of the application with the DNA capability.

For example, there are three applications, an APP 1, an APP 2, and an APP 3 in a current DN, and the three applications respectively correspond to DNAI capabilities, NO, Yes, and Yes, as listed in Table 3.

TABLE 3

| Application | DNAI information | DNAI capability |
|---|---|---|
| APP 1 | DNAI 1 | NO |
| APP 2 | DNAI 2 | Yes |
| APP 3 | DNAI 2 | Yes |
| ... | ... | |

After obtaining the policy information listed in Table 3, the terminal device may transmit data of the APP 2 and the APP 3 in a same PDU session 1, and separately transmit data of the APP 1 in another PDU session 2.

It should be noted that, in addition to the several manners listed above, in this embodiment of this application, the terminal device may further determine, based on other indication information used to indicate a data network access point, the PDU session in which the application is located. Details are not listed one by one herein. In addition, in the foregoing manners provided in this embodiment of this application, the PDU session used to transmit the data of the application may be further determined with reference to information such as a data network name (DNN), and a session and service continuity mode (SSC mode). In other words, the policy information may further include information such as a DNN and an SSC mode. If information such as DNNs and SSC modes of different applications in the policy information is the same, processing may be performed in this manner. If information such as DNNs and SSC modes is not completely different, these factors may further need to be considered, and a PDU session in which the application is located is determined. For example, when DNNs and SSC modes of different applications are the same, but DNAIs are different, it is determined that data of these applications is transmitted in a same PDU session.

With reference to the foregoing descriptions, in step 402, the PCF network element obtains the application request message and generates the indication information in a plurality of manners. Several possible processing manners are listed herein.

Manner 1: The indication information may be obtained by the PCF network element from preconfiguration information, for example, obtained from a database such as a unified data repository (UDR) or unified data management (UDM).

Figure 5:
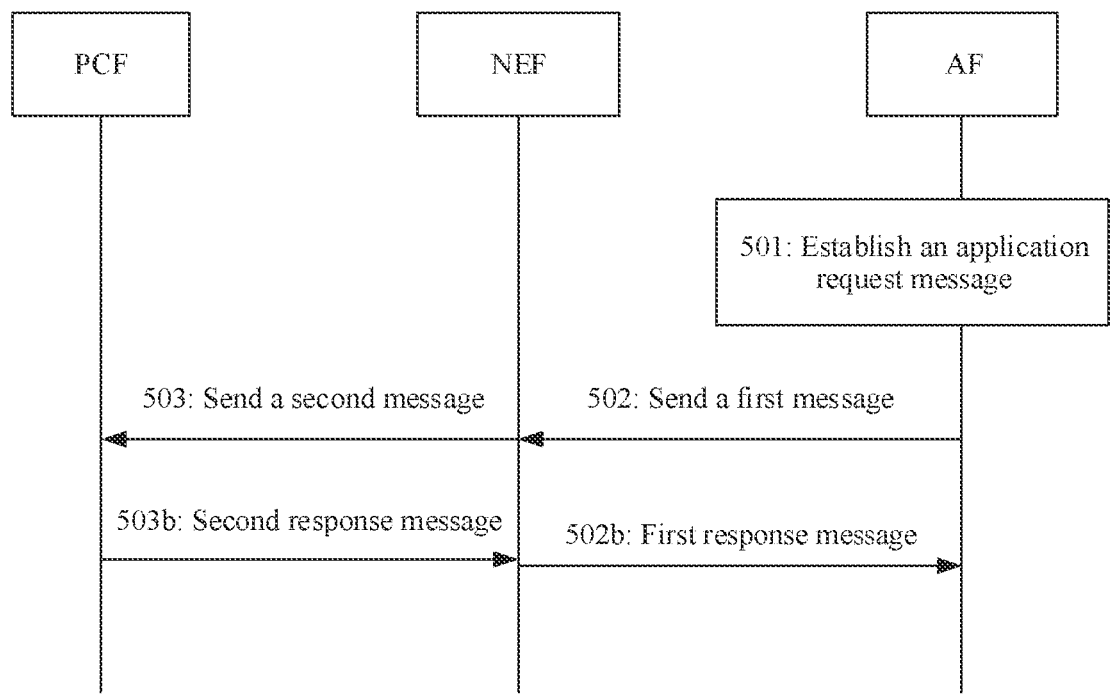
FIG. 5 is a schematic interaction diagram of an indication information generation manner according to an embodiment of this application.

Manner 2: The indication information may be generated by the PCF network element based on messages from the AF network element and the NEF network element. As shown in FIG. 5, detailed steps are as follows:

Step 501: An AF network element establishes an application request message, where the application request message may include DNAI information.

Step 502: The AF network element sends a first message to a NEF network element, where the first message includes the DNAI information.

If the first message includes geographical location information of an application server, the NEF may map the geographical location information of the application server to a DNAI list, and the DNAI list may include one or more DNAs.

In a possible implementation, the NEF network element may further map applications to different DNNs based on different DNAIs, for example, map applications with a same DNAI to a same DNN.

Step 502b: A PCF network element sends a first response message to the AF network element.

Step 503: The NEF network element sends a second message to the PCF network element, where the second message includes the DNAI list, and the DNAI list may be received by the NEF network element from the AF network element, or may be a DNAI list generated by the NEF network element based on a location of the AF; and when the PCF network element receives the DNAI list, the PCF network element may map a same DNAI to a DN corresponding to a same DNN.

Step 503b: The PCF network element sends a second response message to the NEF network element.

In the foregoing manner, after the terminal device determines the PDU session for data transmission, if a PDU session matching an application service exists in a communications system, the terminal device performs the service of the application by using the PDU session, or if no PDU session matching the application service exists, the terminal device may initiate establishment of the PDU session, to establish the PDU session used to transmit the application service.

Figure 6:
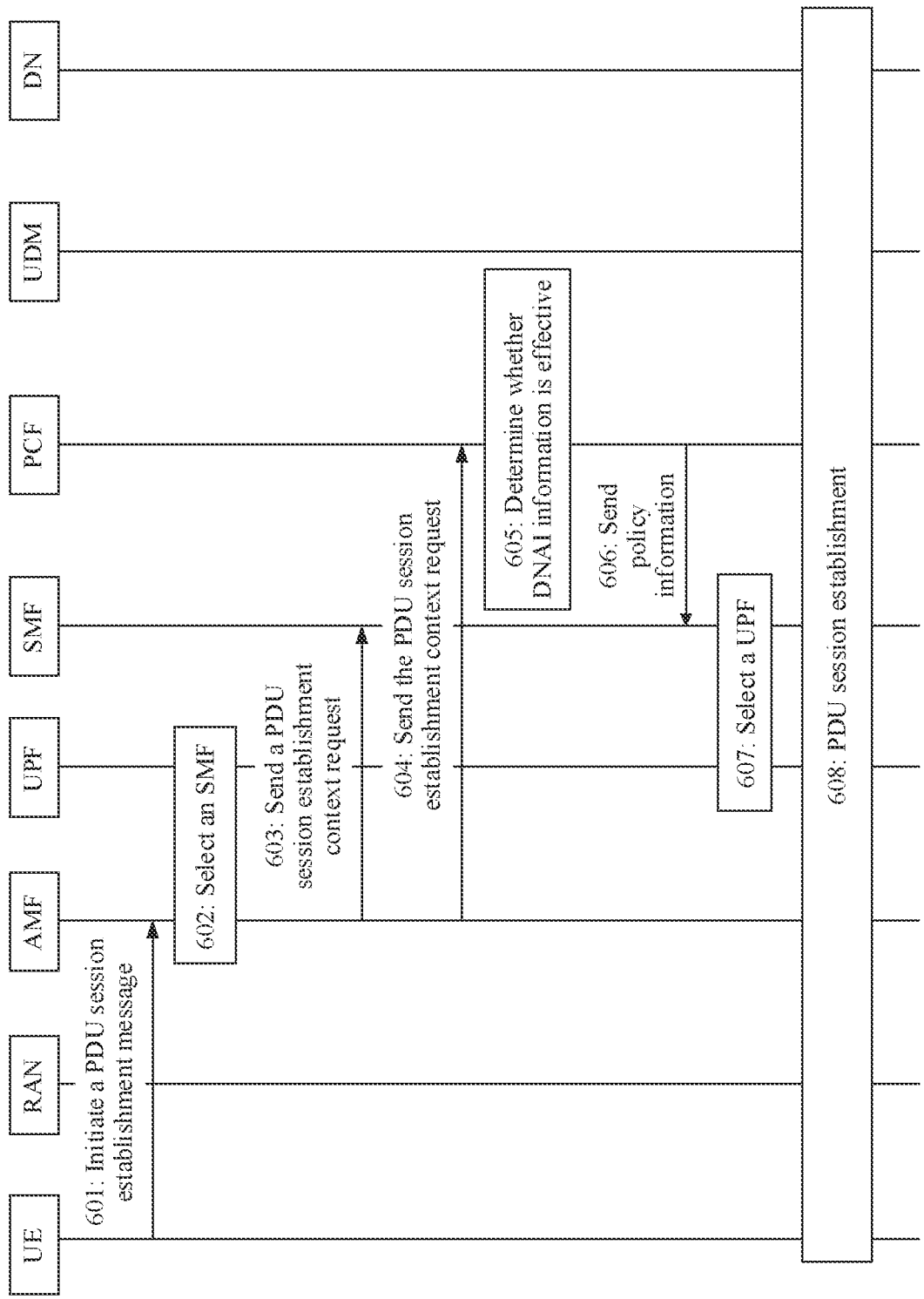
FIG. 6 is a schematic interaction flowchart of a PDU session establishment manner according to an embodiment of this application.

To more clearly understand the data transmission method provided in this embodiment of this application, the following uses a PDU session establishment process as an example for description. As shown in FIG. 6.

601: After receiving policy information from a PCF network element, UE initiates a PDU session establishment message to an AMF network element. The PDU session establishment message includes indication information. The indication information may be at least one of DNAI information corresponding to an application, information about a DNAI capability requested by the application, and parameter information used to determine the DNA information corresponding to the application.

602: The AMF network element selects an SMF network element.

603: The AMF network element initiates a PDU session establishment context request to the selected SMF network element. The PDU session establishment context request message includes the indication information. The indication information may be the DNAI information, information determined based on the DNAI information, or the like.

604: The AMF network element sends the PDU session establishment context request to the PCF network element, where the PDU session establishment context request includes current UE location information or time information of the session establishment request.

605: The PCF determines effective DNAI information in the indication information based on an effective location area or an effective time (to be specific, when the UE is in the effective location area, the indication information is effective, or when a time of the session establishment request is within the effective time, the indication information is effective).

606: Then, the PCF network element sends the policy information to the SMF network element, where when the indication information is effective, first policy information that includes the indication information is sent, or when the indication information is ineffective, second policy information that does not include the indication information is sent.

607: After receiving the policy information, the SMF network element selects a UPF network element.

608: A PDU session channel is successfully established.

In the flowchart shown in FIG. 6, step 604 may be replaced with any one of the following execution manners.

Manner 1: The PCF network element determines, based on an establishment time of the PDU session establishment request, whether the indication information in the establishment request is effective. If the indication information is effective, the PCF network element indicates the SMF network element to select the UPF network element based on the indication information in the establishment request message. Otherwise, the PCF network element no longer indicates the SMF network element to select the UPF network element based on the indication information.

Manner 2: The PCF network element determines, based on the location information of the PDU session establishment request, whether the indication information in the establishment request is effective. If the indication information is effective, the PCF network element indicates the SMF network element to select the UPF network element based on the indication information in the establishment request message. Otherwise, the PCF network element no longer indicates the SMF network element to select the UPF network element based on the indication information.

Manner 3: The PCF network element determines, based on the establishment time and the location information of the PDU session establishment request, whether the indication information in the establishment request is effective. If the indication information is effective, the PCF network element indicates the SMF network element to select the UPF network element based on the indication information in the establishment request message. Otherwise, the PCF network element no longer indicates the SMF network element to select the UPF network element based on the indication information.

In the foregoing embodiment provided in this application, the data transmission method provided in the embodiments of this application is separately described from a perspective of network elements and from a perspective of interaction between the network elements. It may be understood that, to implement the foregoing functions, the network elements, such as the terminal device (for example, the UE), the network device (for example, the SMF device and the AMF device), and the base station, include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

Figure 7:
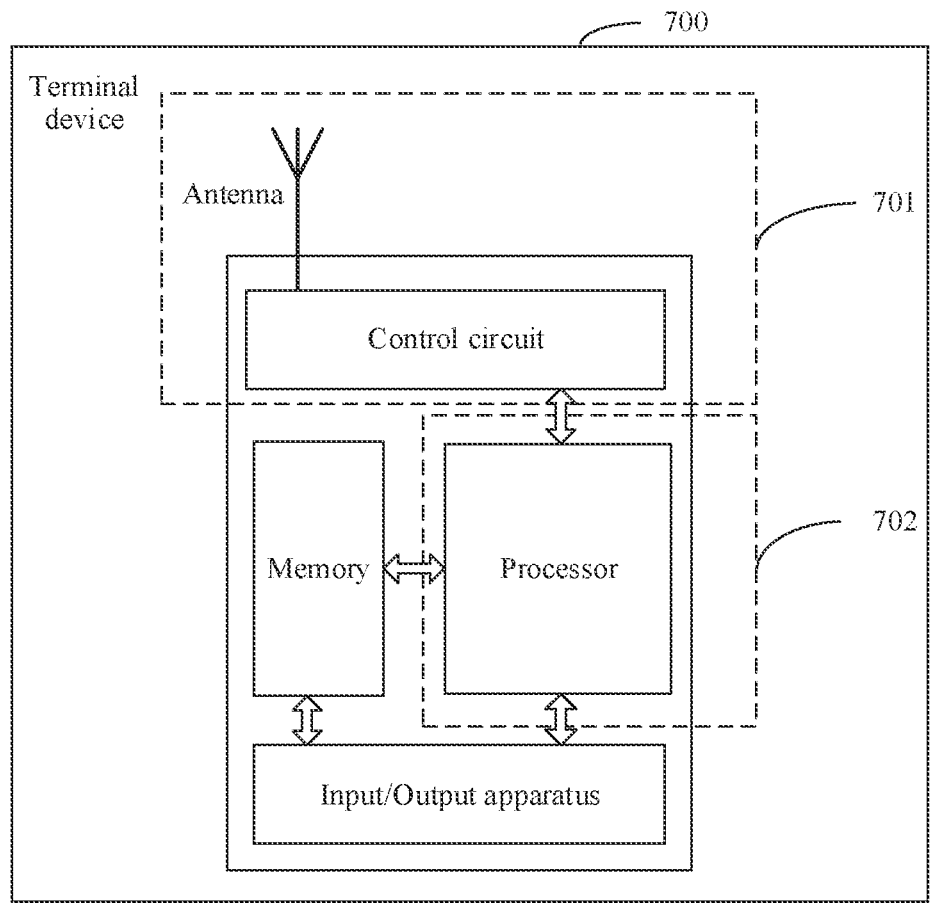
FIG. 7 is a schematic structural diagram of a terminal device according to an embodiment of this application.

Based on a same inventive concept, an embodiment of this application further provides a terminal device 700, as shown in FIG. 7. For ease of description, FIG. 7 shows only main components of the terminal device. As shown in FIG. 7, the terminal device 700 includes a processor, a memory, a control circuit, an antenna, and an input/output apparatus. The processor is mainly configured to: process a communication protocol and communication data, control the entire terminal device, execute a software program, and process data of the software program. For example, the processor is configured to support the terminal device 700 in performing the method steps performed by the terminal device in the embodiments shown in FIG. 4 and FIG. 6. The memory is mainly configured to store software program and data. The control circuit is mainly configured to: perform conversion between a baseband signal and a radio frequency signal, and process the radio frequency signal. The control circuit, together with the antenna, may also be referred to as a transceiver that is mainly configured to send and receive a radio frequency signal in an electromagnetic wave form. The input/output apparatus, such as a touchscreen, a display, or a keyboard, is mainly configured to: receive data entered by a user, and output data to the user.

After the terminal device is powered on, the processor may read the software program in a storage unit, explain and execute an instruction of the software program, and process the data of the software program. When data needs to be sent in a wireless manner, the processor performs baseband processing on to-be-sent data, and then outputs a baseband signal to a radio frequency circuit. After performing radio frequency processing on the baseband signal, the radio frequency circuit sends a radio frequency signal to the outside by using the antenna in an electromagnetic wave form. When data is sent to the terminal device 700, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 7 shows only one memory and only one processor. In an actual terminal device, there may be a plurality of processors and a plurality of memories. The memory may also be referred to as a storage medium, a storage device, or the like. This is not limited in this application.

In an optional implementation, the processor may include a baseband processor and a central processing unit. The baseband processor is mainly configured to process a communication protocol and communication data. The central processing unit is mainly configured to: control the entire terminal device 700, execute a software program, and process data of the software program. The processor in FIG. 7 integrates functions of the baseband processor and the central processing unit. A person skilled in the art may understand that the baseband processor and the central processing unit may be alternatively processors independent of each other, and are interconnected by using a technology such as a bus. A person skilled in the art may understand that the terminal device may include a plurality of baseband processors to adapt to different network standards, the terminal device 700 may include a plurality of central processing units to improve a processing capability of the terminal device 700, and the components of the terminal device 700 may be connected through various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in a storage unit in a software program form. The processor executes the software program to implement a baseband processing function.

For example, in this application, the antenna and the control circuit that have sending and receiving functions may be considered as a transceiver unit 701 of the terminal device 700, and the processor having a processing function may be considered as a processing unit 702 of the terminal device 700. As shown in FIG. 7, the terminal 700 includes the transceiver unit 701 and the processing unit 702. The transceiver unit may also be referred to as a transceiver, a transceiver machine, a transceiver apparatus, or the like. Optionally, a component that is in the transceiver unit 701 and that is configured to implement a receiving function may be considered as a receiving unit, and a component that is in the transceiver unit 701 and that is configured to implement a sending function may be considered as a sending unit. In other words, the transceiver unit 701 includes the sending unit and the receiving unit. For example, the transceiver unit may also be referred to as a receiver machine, a receiver, a receiver circuit, or the like, and the transceiver unit may be referred to as a transmitter machine, a transmitter, a transmitter circuit, or the like.

On a downlink, a downlink signal (including data information and/or control information) from a network device is received by using the antenna, for example, indication information from a PCF network element is received. On an uplink, an uplink signal (including data information and/or control information) is sent to the network device by using the antenna, for example, a session establishment message is sent to an SMF network element. In the processor, service data and a signaling message are processed, and these units perform processing based on a radio access technology (for example, an access technology in LTE, NR, and another evolved system) used by a radio access network. The processor is further configured to control and manage an action of the terminal device, to perform processing performed by the terminal device in the foregoing embodiments.

It may be understood that FIG. 7 shows merely a simplified design of the terminal device. In an actual application, the terminal device may include any quantity of antennas, memories, processors, and the like, and all terminal devices that can implement this application fall within the protection scope of this application.

Specifically, in this application, for example, the transceiver unit 701 is referred to as a transceiver, and the processing unit 702 is referred to as a processor. In this case, the transceiver in the terminal device 700 is configured to receive the indication information from the PCF network element.

The processor may be specifically configured to determine, based on the indication information, a PDU session used to transmit data of each application. For another specific implementation, refer to the foregoing method embodiments. Details are not described herein again.

Figure 8:
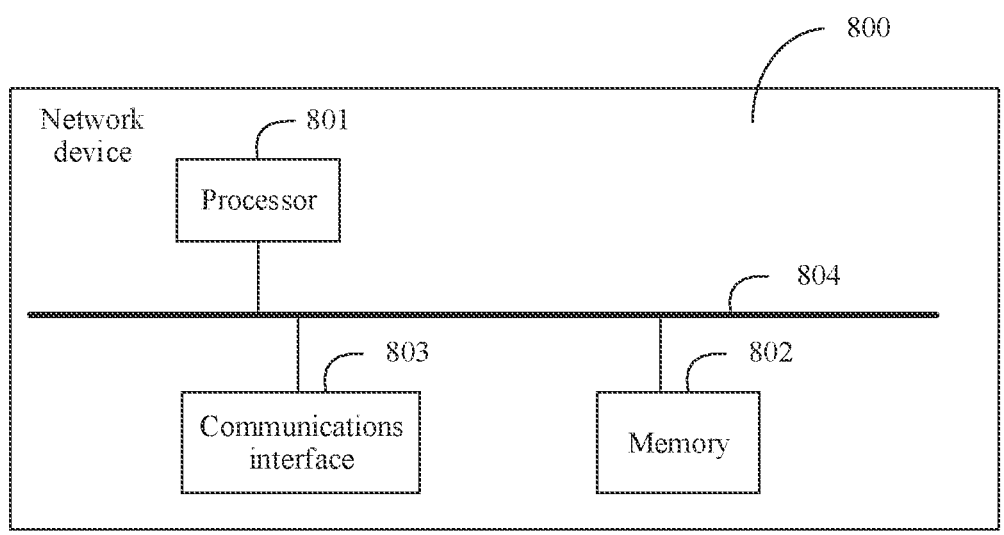
FIG. 8 is a schematic structural diagram of a device according to an embodiment of this application.

Based on a same inventive concept, an embodiment of this application further provides an apparatus 800. The apparatus 800 may be a network device. As shown in FIG. 8, the apparatus 800 includes at least a processor 801 and a memory 802, may further include a communications interface 803, and may further include a bus 804.

The processor 801, the memory 802, and the communications interface 803 are all connected through the bus 804.

The memory 802 is configured to store a computer-executable instruction.

The processor 801 is configured to execute the computer-executable instruction stored in the memory 802.

When the apparatus 800 is the network device (for example, an SMF network element or a PCF network element), the processor 801 executes the computer-executable instruction stored in the memory 802, so that the apparatus 800 performs the steps performed by the network device in the embodiments shown in FIG. 4 to FIG. 6 that are provided in the embodiments of this application, or the network device deploys functional units corresponding to the steps.

The processor 801 may include different types of processors 801, or include a same type of processor 801. The processor 801 may be any one of the following components with a calculation and processing capability: a central processing unit (CPU), an ARM processor (advanced RISC machines for AMR: and English full name of RISC: reduced instruction set computing), a field programmable gate array (FPGA), a dedicated processor, and the like. In an optional implementation, the processor 801 may be integrated as a many-core processor.

The memory 802 may be any one or any combination of the following storage media: a random access memory (RAM), a read-only memory (ROM), a nonvolatile memory (NVM), a solid-state drive (SSD), a mechanical hard disk, a magnetic disk, a disk array, and the like.

The communications interface 803 is configured to perform data exchange between the apparatus 800 and another device. For example, if the apparatus 800 is the network device, the network device may perform the method performed by the network device in any one of the foregoing embodiments. The network device exchanges data with the terminal device through the communications interface 803.

The bus 804 may include an address bus, a data bus, a control bus, and the like. For ease of denotation, the bus is represented by using a thick line in FIG. 8. The bus 804 may be any one or any combination of the following components for wired data transmission: an industry standard architecture (ISA) bus, a peripheral component interconnect (PCI) bus, an extended industry standard architecture (EISA) bus, and the like.

When the apparatus 800 is the network device, the processor 801 may be configured to:

obtain, through the communications interface 803, DNAI information corresponding to an application.

Optionally, the indication information includes at least one of the DNAI information corresponding to the application, information about a DNAI capability requested by the application, and parameter information used to determine the DNA information corresponding to the application. For another specific implementation, refer to the foregoing method embodiments. Details are not described herein again.

Figure 9:
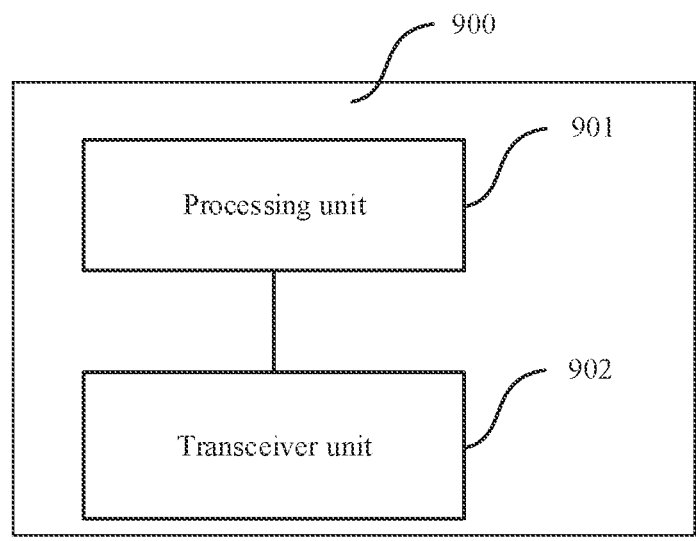
FIG. 9 is a schematic structural diagram of an apparatus corresponding to a terminal device according to an embodiment of this application.

Based on a same inventive concept, this application further provides a terminal device 900. As shown in FIG. 9, the terminal device 900 includes a processing unit 901 and a transceiver unit 902, and may be configured to perform the methods performed by the terminal device in the embodiments shown in FIG. 4 or FIG. 6. Optionally, the processing unit 901 and the transceiver unit 902 are configured to perform processing as follows.

The transceiver unit 902 is configured to receive indication information from a PCF network element, where the indication information is used to indicate DNAI information corresponding to an application.

The processor 901 is configured to determine, based on the indication information, a PDU session used to transmit data of the application.

In a possible implementation, the indication information includes at least one of the DNAI information corresponding to the application, information about a DNAI capability requested by the application, and parameter information used to determine the DNAI information.

In a possible implementation, when the indication information includes the information about the DNAI capability requested by the application, the processing unit 901 is specifically configured to transmit, in a same PDU session, an application with a DNAI request capability. In other words, the terminal device transmits, in different PDU sessions, an application without a DNAI request capability.

In a possible implementation, when the indication information includes the DNAI information corresponding to the application, the processing unit 901 is specifically configured to transmit, in a same PDU session, applications corresponding to same DNAI information. In other words, the terminal device transmits, in different PDU sessions, applications corresponding to different DNAI information. For another specific implementation, refer to the foregoing method embodiments. Details are not described herein again.

Figure 10:
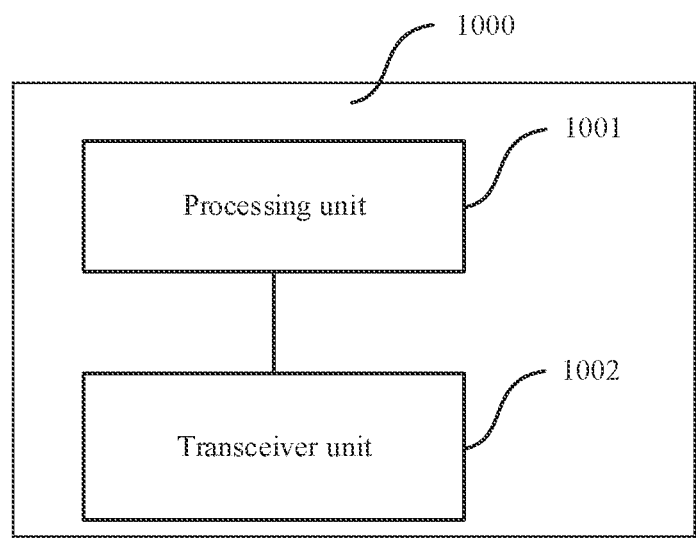
FIG. 10 is a schematic structural diagram of an apparatus corresponding to a network device according to an embodiment of this application.

Based on a same inventive concept, this application further provides a network device 1000. As shown in FIG. 10, the network device 1000 includes a processing unit 1001 and a transceiver unit 1002. Optionally, the processing unit 1001 and the transceiver unit 1002 are configured to perform processing as follows.

The transceiver unit 1002 is configured to obtain DNA information corresponding to an application, and is further configured to send indication information to a terminal device, where the indication information is used to indicate the DNAI information corresponding to the application.

In a possible implementation, the indication information includes at least one of the DNAI information corresponding to the application, information about a DNAI capability requested by the application, and parameter information used to determine the DNAI information corresponding to the application.

In a possible implementation, the transceiver unit 1002 is further configured to obtain at least one of an effective location area and an effective time of the DNAI information.

In this way, when the terminal device sends a PDU session establishment message, the processing unit 1001 is configured to, determine whether a location of the terminal device is in the effective location area, or determine whether a time of the PDU session establishment message is within the effective time. If yes, the transceiver unit 1002 may send policy information that includes the indication information to an SMF network element, and then the SMF network element selects a UPF network element in a PDU session based on the indication information.

On the contrary, if no, the transceiver unit 1002 sends, to the SMF network element, policy information that does not include the indication information, and then the SMF network element selects the UPF network element in the PDU session based on an existing procedure.

An embodiment of this application provides a computer-readable storage medium. The computer-readable storage medium stores a computer-executable instruction. A processor of a terminal device executes the computer-executable instruction, so that the terminal device performs the steps performed by the terminal device in the foregoing data processing method provided in this application, or functional units corresponding to the steps are deployed for the terminal device.

An embodiment of this application provides a computer-readable storage medium. The computer-readable storage medium stores a computer-executable instruction. A processor of a network device executes the computer-executable instruction, so that the network device performs the steps performed by the network device in the foregoing data processing method provided in this application, or functional units corresponding to the steps are deployed for the network device. The network device may be a core network side device such as a PCF network element or an SMF network element.

An embodiment of this application provides a computer program product. The computer program product includes a computer-executable instruction, and the computer-executable instruction is stored in a computer-readable storage medium. A processor of a terminal device may read the computer-executable instruction from the computer-readable storage medium. The processor executes the computer-executable instruction, so that the terminal device performs the steps performed by the terminal device in the foregoing method provided in the embodiments of this application, or functional units corresponding to the steps are deployed for the terminal device.

An embodiment of this application provides a computer program product. The computer program product includes a computer-executable instruction, and the computer-executable instruction is stored in a computer-readable storage medium. A processor of a network device may read the computer-executable instruction from the computer-readable storage medium. The processor executes the computer-executable instruction, so that the network device performs the steps performed by the network device in the foregoing method provided in the embodiments of this application, or functional units corresponding to the steps are deployed for the network device. The network device may be a core network side device such as a PCF network element or an SMF network element.

This application further provides a chip system. The chip system includes a processor, configured to support a terminal device in implementing functions according to the foregoing aspects, for example, generating, receiving, or processing data and/or information in the foregoing methods. In a possible design, the chip system further includes a memory. The memory may be configured to store a program instruction and data that are necessary for the terminal device. The chip system may include a chip, or may include a chip and another discrete device.

This application further provides a chip system. The chip system includes a processor, configured to support a network device in implementing functions in the foregoing aspects, for example, generating, receiving or processing data and/or information in the foregoing methods. In a possible design, the chip system further includes a memory. The memory is configured to store a program instruction and data that are necessary for the network device. The chip system may include a chip, or may include a chip and another discrete device. The network device may be a core network side device such as a PCF network element or an SMF network element.

All or some of the foregoing embodiments may be implemented by using software, hardware, firmware, or any combination thereof. When software is used to implement the embodiments, the embodiments may be implemented partially in a form of a computer program product. The computer program product includes one or more computer instructions. When the computer program instructions are loaded and executed on a computer, all or some of the procedures or functions according to this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person skilled in the art may further understand that various illustrative logical blocks and steps that are listed in this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of this application.

Various illustrative logic units and circuits described in this application may implement or operate the functions by using a general-purpose processor, a digital signal processor, an application-specific integrated circuit (ASIC), a field-programmable gate array (FPGA) or another programmable logic apparatus, a discrete gate or transistor logic, a discrete hardware component, or a design of any combination of the foregoing devices. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in this application may be directly embedded into hardware, a software unit executed by a processor, or a combination thereof. The software unit may be stored in a random access memory (RAM), a flash memory, a read-only memory (ROM), an erasable programmable read-only register (EPROM), a register, a hard disk, a removable disk, or a compact disc read-only memory (CD-ROM), or any other form of storage medium in the art. For example, the storage medium may connect to a processor, so that the processor may read information from the storage medium and write information to the storage medium. Alternatively, the storage medium may further be integrated into a processor. The processor and the storage medium may be disposed in an ASIC, and the ASIC may be disposed in the terminal device or the network device. Optionally, the processor and the storage medium may alternatively be disposed in different components in the terminal device or the network device.

In one or more example designs, the functions described in this application may be implemented by using hardware, software, firmware, or any combination thereof. If the functions are implemented by using software, the functions may be stored in a computer-readable medium or are transmitted to the computer-readable medium in a form of one or more instructions or code. The computer-readable medium includes a computer storage medium and a communications medium that enables a computer program to move from one place to another place. The storage medium may be an available medium that may be accessed by any general-purpose or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of an instruction or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as an infrared manner, a radio manner, or a microwave manner, the software is also included in a defined computer-readable medium. The disc and the disk include a compact disk, a laser disk, an optical disc, a digital versatile disc (DVD), a floppy disk, and a Blu-ray disc. The disk usually copies data by a magnetic means, and the disc usually copies data optically by a laser means. The foregoing combination may also be included in the computer-readable medium.

A person skilled in the art should be aware that in the foregoing one or more examples, the functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or a special-purpose computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application. According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A data transmission method, comprising:
receiving, by a terminal device, indication information from a policy control function (PCF) network element, wherein the indication information indicates data network access identifier (DNAI) information corresponding to an application; and
determining, by the terminal device and based on the indication information, a packet data unit (PDU) session for transmitting data of the application, wherein the indication information comprises information about a DNAI capability requested by the application, and the PDU session for transmitting data of the application is determined based on using a same PDU session to transmit data of applications that has a same DNAI request capability.

2. The method according to claim 1, wherein the indication information comprises at least one of the DNAI information corresponding to the application, or parameter information for determining the DNAI information corresponding to the application.

3. The method according to claim 1, wherein the determining, by the terminal device and based on the indication information, the PDU session for transmitting data of the application comprises:
sending, by the terminal device, a PDU session establishment message, wherein the PDU session establishment message comprises the DNAI information corresponding to the application.

4. The method according to claim 2, wherein the indication information comprises the DNAI information corresponding to the application, and wherein
the determining, by the terminal device and based on the indication information, the PDU session for transmitting data of the application comprises:
transmitting, by the terminal device in a same PDU session, data of applications corresponding to same DNAI information.

5. The method according to claim 2, wherein the determining, by the terminal device and based on the indication information, the PDU session for transmitting data of the application comprises:
mapping, by the terminal device, applications corresponding to same DNAI information to a same data network name (DNN); and
transmitting, by the terminal device, in a same PDU session, data of applications corresponding to a same DNN.

6. The method according to claim 2, wherein the indication information comprises the parameter information for determining the DNAI information corresponding to the application, and wherein
the determining, by the terminal device and based on the indication information, the PDU session for transmitting data of the application comprises:
transmitting, by the terminal device in a same PDU session, data of applications corresponding to same parameter information.

7. An apparatus, comprising:
at least one processor; and
a memory coupled to the at least one processor and storing instructions for execution by the at least one processor, wherein the instructions instruct the at least one processor to cause the apparatus to:
receive indication information from a policy control function (PCF) network element, wherein the indication information indicates data network access identifier (DNAI) information corresponding to an application; and
determine, based on the indication information, a packet data unit (PDU) session for transmitting data of the application, wherein the indication information comprises information about a DNAI capability requested by the application, and the PDU session for transmitting data of the application is determined based on using a same PDU session to transmit data of applications that has a same DNAI request capability.

8. The apparatus according to claim 3, wherein the indication information comprises at least one of the DNAI information corresponding to the application, or parameter information for determining the DNAI information corresponding to the application.

9. The apparatus according to claim 7, wherein the indication information comprises the DNAI information corresponding to the application, and wherein the determine, based on the indication information, the PDU session for transmitting data of the application comprises:
transmit data of applications corresponding to same DNAI information in a same PDU session.

10. The apparatus according to claim 7, wherein the determine, based on the indication information, the PDU session for transmitting data of the application comprises:
map applications corresponding to same DNAI information to a same data network name DNN; and
transmit data of applications corresponding to a same DNN in a same PDU session.

11. The apparatus according to claim 7, wherein the indication information comprises the parameter information for determining the DNAI information corresponding to the application, and wherein
the determine, device based on the indication information, the PDU session for transmitting data of the application comprises:
transmit data of applications corresponding to same parameter information in a same PDU session.

12. The apparatus according to claim 3, wherein the determine, based on the indication information, the PDU session for transmitting data of the application comprises:
send a PDU session establishment message, wherein the PDU session establishment message comprises the DNAI information corresponding to the application.

13. An apparatus, comprising:
at least one processor; and
a memory coupled to the at least one processor and storing instructions for execution by the at least one processor, wherein the instructions instruct the at least one processor to cause the apparatus to:
obtain data network access identifier (DNAI) information corresponding to an application; and
send indication information to a terminal device, wherein the indication information indicates the DNAI information corresponding to the application, wherein the indication information comprises information about a DNAI capability requested by the application, and the DNAI capability requested by the application is used to determine a PDU session used for transmitting data of the application.

14. The apparatus according to claim 11, wherein the indication information comprises at least one of the DNAI information corresponding to the application, or information for determining the DNAI information corresponding to the application.

15. The apparatus according to claim 11, wherein the instructions further instruct the at least one processor to cause the apparatus to:
obtain at least one of an effective location area and an effective time of the DNAI information.

16. The apparatus according to claim 13, wherein the instructions further instruct the at least one processor to cause the apparatus to:
receive a PDU session establishment message from the terminal device;
determine, based on the PDU session establishment message, that a location of the terminal device is in the effective location area; and
send first policy information to a session management function (SMF) network element, wherein the first policy information comprises the indication information.

17. The apparatus according to claim 13, wherein the instructions further instruct the at least one processor to cause the apparatus to:
receive a PDU session establishment message from the terminal device;
determine, based on the PDU session establishment message, that a time of the PDU session establishment message is within the effective time; and
send first policy information to a SMF network element, wherein the first policy information comprises the indication information.

18. The apparatus according to claim 14, wherein the instructions further instruct the at least one processor to cause the apparatus to:
determine, based on the PDU session establishment message, that the location of the terminal device is not in the effective location area; and
send second policy information to a SMF network element, wherein the second policy information does not comprise the indication information.

* * * * *

UNITED STATES PATENT AND TRADEMARK OFFICE
CERTIFICATE OF CORRECTION

| | |
|---|---|
| PATENT NO. | : 11,431,807 B2 |
| APPLICATION NO. | : 17/106790 |
| DATED | : August 30, 2022 |
| INVENTOR(S) | : Wei Lu and Weisheng Jin |

It is certified that error appears in the above-identified patent and that said Letters Patent is hereby corrected as shown below:

In the Specification

On Column 1 Line 10(Approx.), Delete "PCT/CN2019.088036," and insert
-- PCT/CN2019/088036, --.

Signed and Sealed this
Fifteenth Day of November, 2022

Katherine Kelly Vidal
*Director of the United States Patent and Trademark Office*